United States Patent
Venter et al.

(10) Patent No.: US 11,077,955 B2
(45) Date of Patent: *Aug. 3, 2021

(54) JET ENGINE WITH A LINKING DEVICE

(71) Applicant: Rolls-Royce Deutschland Ltd & Co KG, Blankenfelde-Mahlow (DE)

(72) Inventors: Gideon Daniel Venter, Berlin (DE); Michael Schacht, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 399 days.

This patent is subject to a terminal disclaimer.

(21) Appl. No.: 16/159,076

(22) Filed: Oct. 12, 2018

(65) Prior Publication Data

US 2019/0112061 A1  Apr. 18, 2019

(30) Foreign Application Priority Data

Oct. 16, 2017  (DE) ...................... 10 2017 124 043.8

(51) Int. Cl.
  *B64D 27/26*  (2006.01)
  *B64D 27/20*  (2006.01)
  (Continued)

(52) U.S. Cl.
  CPC .............. *B64D 27/26* (2013.01); *B64D 27/20* (2013.01); *B64D 41/00* (2013.01); *F02C 7/20* (2013.01);
  (Continued)

(58) Field of Classification Search
  CPC ........... F02C 7/32; B64D 27/18; B64D 27/20; B64D 27/26
  See application file for complete search history.

(56) References Cited

U.S. PATENT DOCUMENTS 2,978,869 A    4/1961 Henry et al.
3,799,476 A *  3/1974 Bouiller ................. B64D 41/00
                                                 244/60
(Continued)

FOREIGN PATENT DOCUMENTS

DE       2549771 A1    5/1976
DE    102007044229 A1   3/2009
(Continued)

OTHER PUBLICATIONS

German Search Report dated Aug. 17, 2018 for counterpart German Patent Application No. 10 2017 124 043.8.
(Continued)

*Primary Examiner* — Richard G Davis
(74) *Attorney, Agent, or Firm* — Shuttleworth & Ingersoll, PLC; Timothy Klima

(57) ABSTRACT

A jet engine with a linking device for linking the jet engine at an element of an aircraft optionally in a first mounting position and at least one second mounting position, and with at least one operating equipment appliance that has a first fluid area and a second fluid area. In the first mounting position, the first fluid area is assigned to a first functionality and the second fluid area is assigned to a second functionality. In the second mounting position, the fluid areas are assigned to the respectively other functionality. What is further described is an aircraft with at least one such jet engine.

13 Claims, 4 Drawing Sheets

(51) Int. Cl.
 B64D 41/00 (2006.01)
 F02C 7/20 (2006.01)
 F02C 7/32 (2006.01)

(52) U.S. Cl.
 CPC .......... F02C 7/32 (2013.01); *B64D 2027/262* (2013.01); *F05D 2220/323* (2013.01); *F05D 2240/90* (2013.01)

(56) References Cited

U.S. PATENT DOCUMENTS

| | | | |
|---|---|---|---|
| 4,044,973 A * | 8/1977 | Moorehead | B64D 27/20 244/54 |
| 4,068,470 A * | 1/1978 | Sargisson | F02C 7/32 60/226.1 |
| 5,127,606 A | 7/1992 | Chan et al. | |
| 5,687,561 A * | 11/1997 | Newton | B64D 41/007 60/226.1 |
| 2006/0260323 A1* | 11/2006 | Moulebhar | F02C 7/268 60/793 |
| 2008/0072568 A1* | 3/2008 | Moniz | F01D 25/34 60/226.1 |
| 2010/0193631 A1* | 8/2010 | Laude | B64D 33/00 244/58 |
| 2011/0197595 A1 | 8/2011 | Journade et al. | |
| 2013/0064649 A1 | 3/2013 | Black et al. | |
| 2018/0155041 A1* | 6/2018 | Tesniere | B64D 27/26 |
| 2018/0283274 A1* | 10/2018 | Jackowski | F02C 6/14 |

FOREIGN PATENT DOCUMENTS

| | | | |
|---|---|---|---|
| EP | 1731735 | A2 | 12/2006 |
| EP | 2568143 | A2 | 3/2013 |
| GB | 1136584 | * | 12/1968 |
| GB | 1136584 | A | 12/1968 |

OTHER PUBLICATIONS

European Search Report dated Mar. 20, 2019 for counterpart European Patent Application No. EP18194662.5.

* cited by examiner

JET ENGINE WITH A LINKING DEVICE

This application claims priority to German Patent Application DE102017124043.8 filed Oct. 16, 2017, the entirety of which is incorporated by reference herein.

The invention relates to a jet engine with a linking device for linking the jet engine at an element of an aircraft according to the kind as it is more closely defined herein and an aircraft with such a jet engine according to the kind as it is more closely defined herein.

What is well known from practice is an arrangement of jet engines at an aircraft fuselage in different configurations, wherein the jet engines are usually assigned to a certain side of the aircraft.

For this purpose, in known jet engines two separate engine suspension interfaces are provided, by means of which the mounting of such jet engines on both sides of the aircraft can be ensured.

What is known from U.S. Pat. No. 4,044,973 A is an engine which can be arranged at different linkage points at the right side as well as on the left side and at the tail of an aircraft. However, in order to realize the solution of U.S. Pat. No. 4,044,973 A, disadvantageously multiple interfaces to the aircraft have to be provided to be able to maintain the circumferential orientation of the engine with an identical arrangement of bearing chambers, piping, and the like, in different positions at the aircraft.

Such an embodiment of an engine is difficult to design in particular in the case of a lateral linkage at an aircraft fuselage on different sides of the aircraft.

The present invention is based on the objective to provide a jet engine that can be arranged in a simple and flexible manner at different positions at the aircraft. The present invention is further based on the objective to provide an aircraft with such a jet engine.

This objective is achieved with a jet engine with features as disclosed herein.

What is proposed is a jet engine with a linking device for linking the jet engine at an element of an aircraft, in particular an engine pylon, an aircraft fuselage and/or an aircraft wing, optionally in a first mounting position and at least one second mounting position and with at least one operating equipment appliance that has a first fluid area and a second fluid area, wherein in the first mounting position the first fluid area is assigned to a first functionality and the second fluid area is assigned to a second functionality. According to the invention, it is provided that the fluid areas are assigned to the respectively other functionality in the second mounting position.

A jet engine that is embodied according to the invention has the advantage that it can be arranged at different positions at an aircraft, for example on a left side of the aircraft and a right side of the aircraft, above or below an aircraft wing, at an aircraft fuselage, or at an engine pylon, in a simple and flexible manner with a single linking device by a corresponding twisting of the jet engine.

With the invention, it is advantageously possible to use jet engines of a principally identical construction to link them to the aircraft at different sides of the aircraft in particular with differing linking angles. In addition, it is possible to quickly link a jet engine linked on one side of the aircraft also on the other side of the aircraft with small effort.

Since the different fluid areas can take over the functionality of the respectively other fluid area, in particular a simple left/right interchangeability of the jet engine is possible in the case of a lateral linkage at the aircraft with a corresponding twisting of the engine. In conventional engines, such an interchange would mean turning the engine "upside down", with a corresponding failure of the hydraulic system.

Expediently, the fluid areas are alternatingly assigned to a re-circulation (scavenge/drain) and a venting (vent) as functionalities. Thus, if a twisted arrangement of the jet engine is present, the necessary conduits for oil circulation as well as the ones for venting can be located in a substantially mirror-symmetrical position with respect to a jet engine that is arranged on the other side of the aircraft. In this way, the conduits can be arranged independently of the arrangement of the jet engine in a position that is optimal for their functionality.

In an advantageous embodiment, the fluid areas have conduit areas that are arranged at a distance to each other in the circumferential direction of the jet engine, wherein the conduit areas are arranged in the circumferential direction of the jet engine substantially symmetrical to the linking device.

The linking device can have at least two engine attachment points, wherein, in the area of the engine attachment points, the linking device is expediently connected to a carrier structure of the jet engine, for example a fan housing. Here, the term "engine attachment point" is to be understood in the broadest sense as a locally concentrated attachment appliance. Defined attachment points further facilitate the mountability of the engine at different mounting positions at the aircraft since they define the necessary rotation of the engine between the mounting positions and facilitate a fast and precise orientation of the engine during mounting.

The engine attachment points can be arranged so as to be substantially symmetrical to the linking device in the circumferential direction in a manner comparable to the conduits of the fluid areas. Also, a payload fairing or streamlining fairing, a so-called splitter fairing, in the area of which cabin air and other features having a connection to the engine core [ . . . ], can be arranged here.

Preferably, the linking device has an interface device to the aircraft in the circumferential direction in particular at least approximately centrally with respect to the two engine attachment points. Via the for example flange-like interface device, all necessary connections between the jet engine and the aircraft can be guided like via a channel.

In an advantageous further development of a jet engine according to the invention, at least two lifting points embodied for mounting the jet engine are provided in a manner distributed in the circumferential direction of the jet engine, wherein the lifting points are arranged so as to be symmetrical to the interface device in the circumferential direction, and in particular so as to be interchangeable with regard to their functionality. In this way, assembly and disassembly of the jet engine at an aircraft can be carried out in a simple manner independently of the intended installing position on the one or the other side of the aircraft.

It is advantageous if the conduits of the fluid areas are arranged inside a support strut which usually extends substantially in the radial direction through a bypass channel of the jet engine. For example, three to 36 such support struts can be arranged circumferentially in a substantially evenly distributed manner. For the different fluid areas, it is expedient if their conduits extend through at least two of the support struts. The linkage and interface device towards the aircraft can also be advantageously arranged in the circumferential area of at least one support strut, wherein the operating means of the conduits in which the fluid areas are guided can be arranged in these support struts or in support struts in a manner at least approximately symmetrical to these.

In every angle relationship between the engine attachment points, the number of the struts in connection with the drive shaft, return lines, venting conduits and engine lifting points, their number and positioning should be selected in such a manner that an exact mirroring is possible in the case of a left/right switch at the aircraft with a corresponding switch of the functionality hardware.

The number of the used support struts is preferably selected depending on a present linking angle of the jet engine, i.e. an angle that is opened up by the interface device of the jet engine with respect to a vertical line, wherein in his way a linking angle of between 0° and 135° can be mostly covered, starting from a so-called top dead position. Here, in particular a jet engine with a positive linking angle with respect to a vertical line can for example be linked to an aircraft fuselage on a first side of an aircraft, and a further jet engine with a corresponding negative linking angle can be linked to a second side of the aircraft.

In order to also be able to set an intended linking angle, if necessary, the person skilled in the art can also arrange the support struts so that they are distributed unevenly across the circumference of the jet engine.

What is further proposed is an aircraft with such a jet engine that has a radially outer engine cladding, a so-called nacelle, and a auxiliary device gear appliance that comprises multiple auxiliary devices and that can be driven by a shaft which is in operative connection with an engine shaft that rotates about a central axis, for example a flexible drive shaft, wherein the auxiliary device gear appliance is arranged substantially outside of the outer engine cladding of the jet engine in the radial direction of the jet engine.

By arranging the auxiliary device gear appliance mostly or completely outside of the engine cladding or of the nacelle installation space, a jet engine can be flexibly arranged at an aircraft in a particularly simple manner. In addition, in this manner a cross-sectional area of the jet engine can be considerably reduced as compared to an embodiment in which the auxiliary device gear appliance is arranged inside the engine cladding. In this way, in turn also a length of the jet engine can be reduced, so that an aerodynamic resistance of the jet engine and thus also of the aircraft is advantageously low, and an aircraft that is embodied according to the invention has a low fuel consumption.

The reduced cross-sectional design of the jet engine results in advantages in conventional aircrafts as well as in supersonic aircrafts.

The net weight of a jet engine of an aircraft according to the invention, for example with an auxiliary device gear appliance that is relocated inside a pylon or directly inside the aircraft fuselage, is considerably reduced as compared to a conventional jet engines with an integrated auxiliary device gear appliance, whereby a load on the engine is also reduced. Here, structural components can be designed more easily with a lower weight, so that in the event of damage with an imbalanced state, for example in case of a "fan blade off" state after a blade has broken off, the occurring imbalances are correspondingly smaller.

Further, the auxiliary device gear appliance can be arranged in an area in which improved temperature and vibration conditions are present as compared to an arrangement inside the outer engine casing. In this way, longer service lives of auxiliary device gear appliances can be achieved.

In a further development of the invention, the auxiliary device gear appliance can be linked to a frame appliance, in particular a so-called space frame, which, on the one hand, is directly connected to the corresponding aircraft component such as the aircraft fuselage and/or an aircraft wing, and, on the other hand, is preferably connected to the linking device of the jet engine. Here, the frame appliance can be a module that can be pre-mounted to the auxiliary device gear appliance and that can have interfaces to the jet engine and to the aircraft.

In an advantageous embodiment of an aircraft according to the invention, the frame appliance is at least partially arranged inside an engine pylon assigned to the jet engine, so that the frame appliance and the auxiliary device gear appliance are positioned in an aerodynamically advantageous manner.

To facilitate mounting the auxiliary device appliance to the frame appliance, the frame appliance can have linking elements for the auxiliary devices, conduits, tubes and/or wiring harnesses.

In an embodiment of the invention that is advantageous with respect to installation space, the auxiliary device gear appliance is at least partially arranged inside the aircraft fuselage and/or a pylon and/or of an aircraft wing, in particular in the linkage area of the jet engine at the aircraft fuselage or the aircraft wing.

The drive shaft of the auxiliary device gear appliance can extend through a support strut of the jet engine, with the jet engine being linked to the engine pylon, the aircraft fuselage or the aircraft wing in its area.

The features specified in the patent claims as well as the features specified in the following exemplary embodiments of the jet engine according to the invention or of the aircraft according to the invention are suitable to further develop the subject matter according to the invention respectively on their own or in any desired combination with each other.

Further advantages and advantageous embodiments of the jet engine according to the invention or of the aircraft according to the follow from the patent claims and from the exemplary embodiment that is described in principle in the following by referring to the drawing.

Herein:

Figure 1:
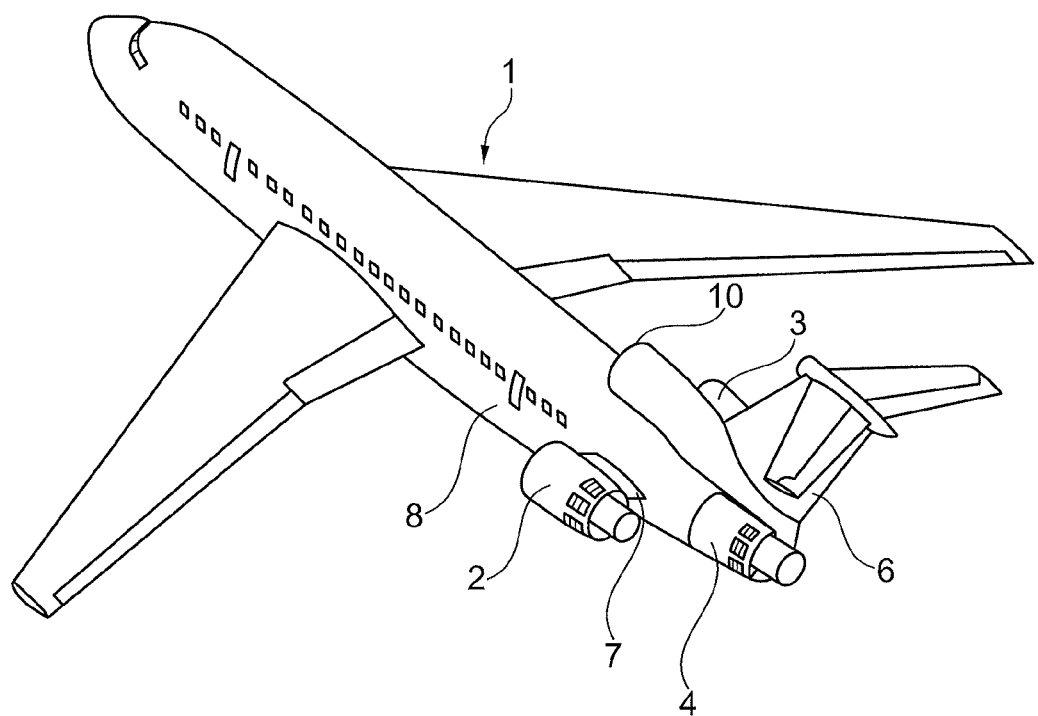
FIG. 1 shows a simplified three-dimensional view of an aircraft with jet engines that are arranged in the tail area at an aircraft fuselage.

Referring to FIG. 1, what is shown is a passenger aircraft 1 that can be driven by three jet engines 2, 3, 4. The first jet engine 2 is arranged on a left side of the aircraft in the tail area of the aircraft 1 in the area of a vertical stabilizer 6 and linked to an aircraft fuselage 8 in the area of an engine pylon 7. The second jet engine 3 is connected to the aircraft fuselage 8 in a substantially mirror-symmetrical manner on a right side of the aircraft.

The third jet engine 4 is positioned at the rear end of aircraft fuselage 8 and attached at an inner fuselage strut that is arranged below the vertical stabilizer 6 of the aircraft 1. For supplying air to the third jet engine 4, an air inlet 10 is provided that is arranged in the flight direction in front of the vertical stabilizer 6 on a top side of the aircraft fuselage 8 and is connected to the third jet engine 4 inside the aircraft fuselage 8.

In general, a variety of arrangements of jet engines at an aircraft is possible, wherein, besides the shown positions, a jet engine can for example also be arranged in the area of an aircraft wing, below or above the same.

Figure 2:
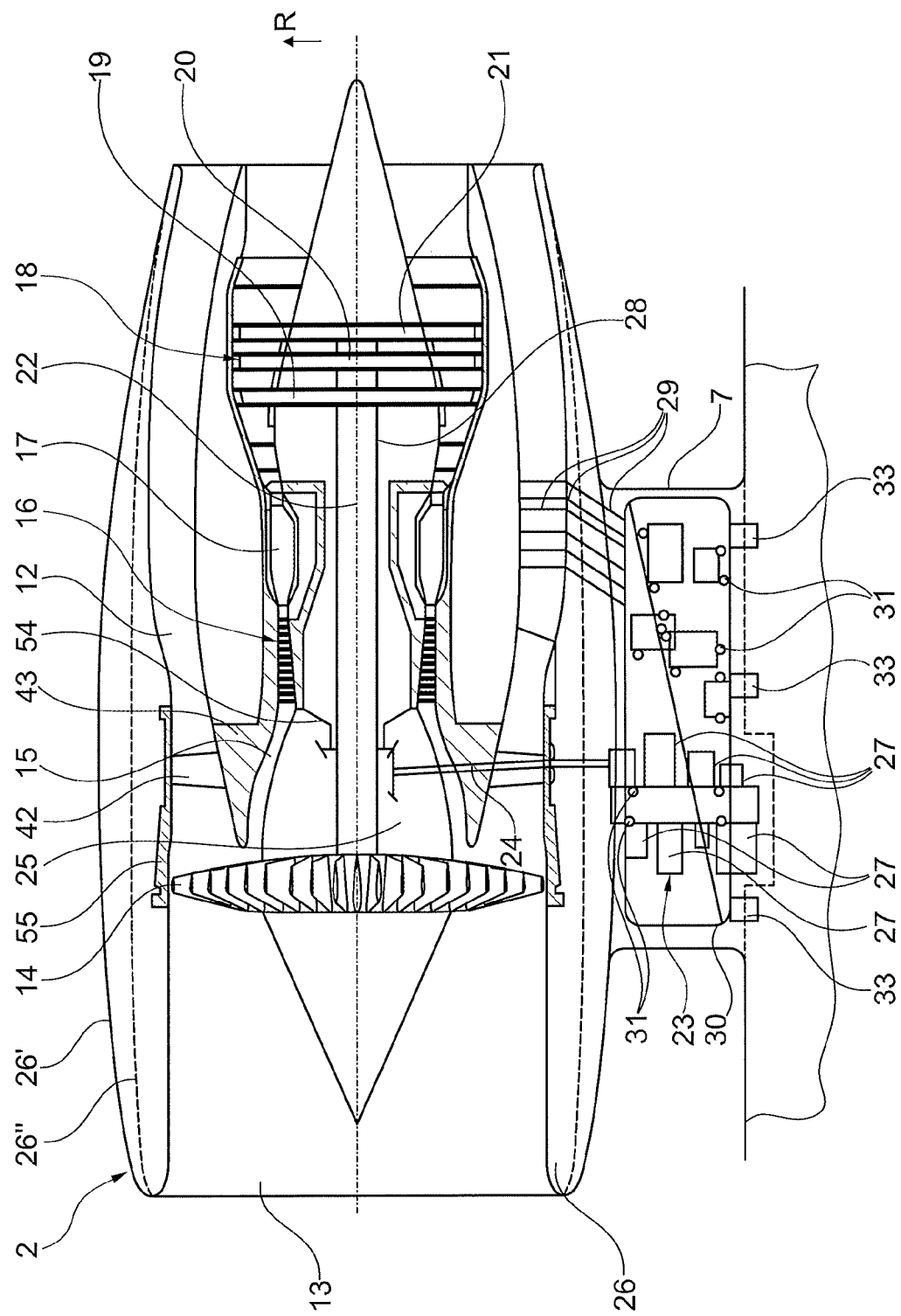
FIG. 2 shows a simplified longitudinal section view of a jet engine of the aircraft according to FIG. 1, wherein a linkage of the jet engine to the aircraft fuselage can be seen.

In FIG. 2, the jet engine 2 is shown in a longitudinal section view and formed with a bypass channel 12 and an inflow area 13, wherein a fan 14 connects to the inflow area 13 downstream in a per se known manner. Downstream of the fan 14, the fluid flow is in turn divided in the jet engine 2 into a bypass flow and a core flow, wherein the bypass flow flows through the bypass channel 12 and the core flow flows into an engine core 15 or core flow channel, which is in turn embodied in a per se known manner with a compressor appliance 16, a burner 17 and a turbine appliance 18. In the present case, the turbine appliance 18 has three rotor devices 19, 20 and 21 that are mounted so as to be rotatable about a central axis 22.

In the embodiment of the jet engine 2 according to FIG. 2, an auxiliary device gear appliance 23 or auxiliary unit gear appliance is arranged in the radial direction of the jet engine 2 outside of a nacelle installation space 26 forming an outer engine cladding. In the present case, the auxiliary device gear appliance 23 can be driven via a drive shaft 24 that extends substantially in the radial direction of the jet engine 2 and that is connected to an engine shaft, here a high-pressure shaft 54, rotating about a central axis 22 of the jet engine 2, which in the present case is realized via a bevel gear 25. Thus, the auxiliary device gear appliance 23 that comprises different auxiliary units 27, such as for example a starter, a generator, an oil separator or the like, are driven or supplied with a torque by the high-pressure shaft 54 during operation of the jet engine 2.

As can further be seen from FIG. 2, the auxiliary device gear appliance 23 is arranged inside the engine pylon 7, wherein the conduits 29 by means of which the auxiliary units 27 are connected to the jet engine 2 can also be seen.

Arranged inside the engine pylon 7 is a frame appliance 30, a so-called space frame to which, besides the auxiliary units 27 of the auxiliary device gear appliance 23, also conduits, tubes and wiring harnesses can be linked by means of schematically shown linking elements 31. The frame appliance 30 is in particular embodied with a grid structure that can be adjusted depending on the elements to be arranged.

As can further be seen from FIG. 2, in the present case three connection appliances 33 are provided, by means of which the frame appliance 30 is linked to the aircraft fuselage 8 or possibly to an aircraft wing. In further embodiments, also two or more than three connection appliances can be provided.

By arranging the auxiliary device gear appliance 23 with the auxiliary units 27 substantially outside the nacelle installation space 26, the latter can be reduced to a cross section as shown by the dashed line 26" in contrast to a cross section that is shown by the solid line 26' and as its would have to be provided if the auxiliary device gear appliance was arranged inside the nacelle installation space 26.

By arranging the auxiliary device gear appliance 23 outside the nacelle installation space 26, a length of the jet engine 2 can also be reduced, so that an aerodynamic resistance of the jet engine 2 and thus also of the aircraft 1 is advantageously low, and the aircraft 1 has an advantageously low fuel consumption. In addition, in this manner the auxiliary device gear appliance 23 is subjected to more favorable temperature and vibration conditions, so that the auxiliary device gear appliance 23 has a long service life.

FIG. 3 to FIG. 6 show strongly simplified cross-sectional renderings of the jet engine 2 in the area of the engine pylon 7 with the auxiliary device gear appliance 23.

Figure 3:
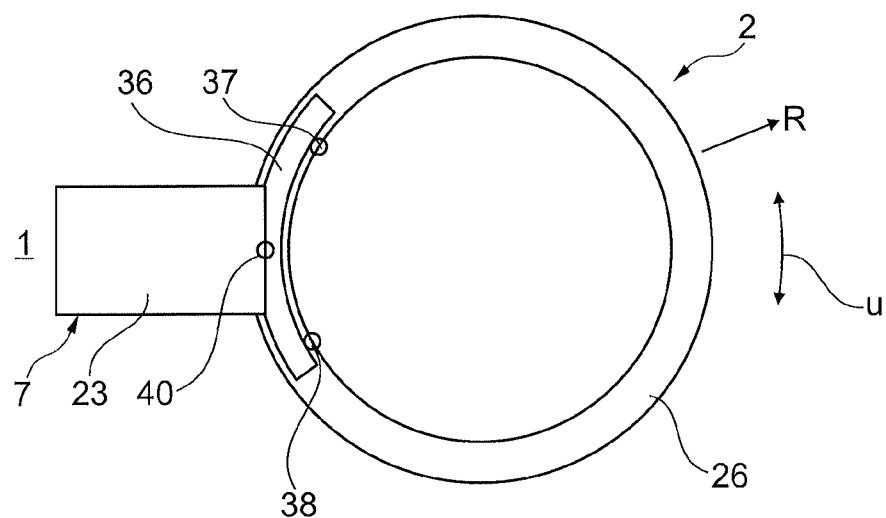
FIG. 3 shows a strongly schematized cross sectional rendering of a jet engine of FIG. 2 of the aircraft according to FIG. 1 in isolation.

FIG. 3 shows a schematic rendering of linking device 36 which, in the present case, has two engine attachment points 37, 38 by means of which, in the present case, the linking device 36 is connected to a fan housing 55. Further, in the present case, the linking device 36 has an interface device 40 by means of which the linking device 36 is connected to the frame appliance 30 and thus to the aircraft fuselage 8. Alternatively, the interface can also be provided at the pylon or directly at the aircraft fuselage.

Figure 4:
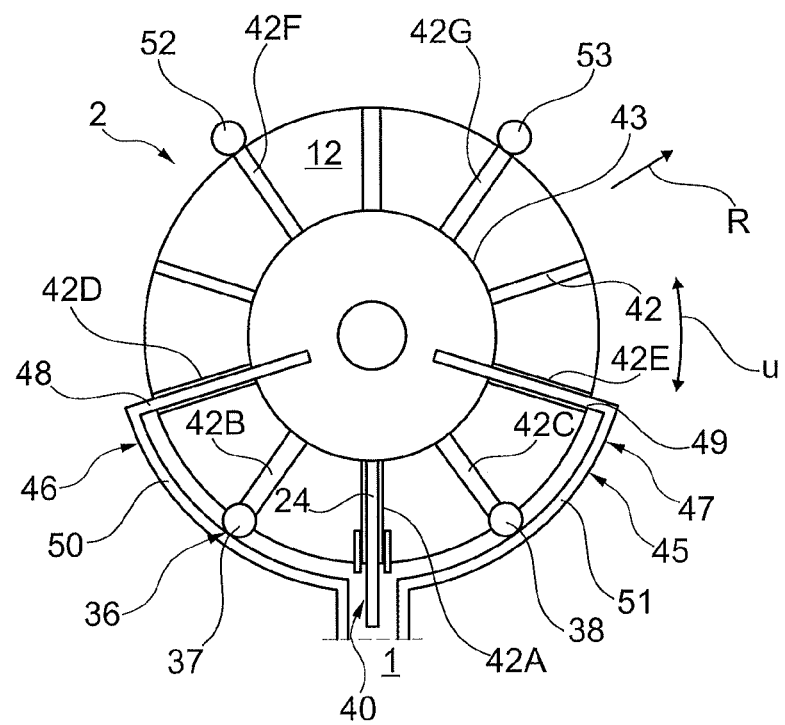
FIG. 4 shows a further strongly schematized sectional view of a jet engine of the aircraft according to FIG. 1 in isolation.

As can be seen in FIG. 4, in which the jet engine 2 is shown in a "neutral" position, i.e. not in installation position, here the interface device 40 as well as the engine attachment points 37, 38 are arranged in the circumferential direction U of the jet engine 2 respectively in the area of a support strut 42, wherein the support struts 42 extend in the radial direction R of the jet engine 2 through the bypass channel 12 and connect the fan housing 55 to an intermediate housing 43. In the present case, ten support struts 42 are provided in a manner evenly distributed in the circumferential direction U. However, the number can also be more or less than that, and can for example vary between 4 and 28 or more.

The interface device towards the aircraft 1 is arranged in the area of a support strut 42A. The engine attachment points 37 and 38 are provided at the support struts 42B and 42C adjacent on both sides, thus arranged substantially symmetrical to the interface device 40, wherein in the present case an angle between the engine attachment points 37, 38 is 72°, as viewed in the circumferential direction U. In addition, in FIG. 4 to FIG. 6, the drive shaft 24 of the auxiliary device gear appliance 23, which is not shown here in any more detail, can respectively be seen in the area of the support strut 42A leading to the interface device 40.

Figure 5:
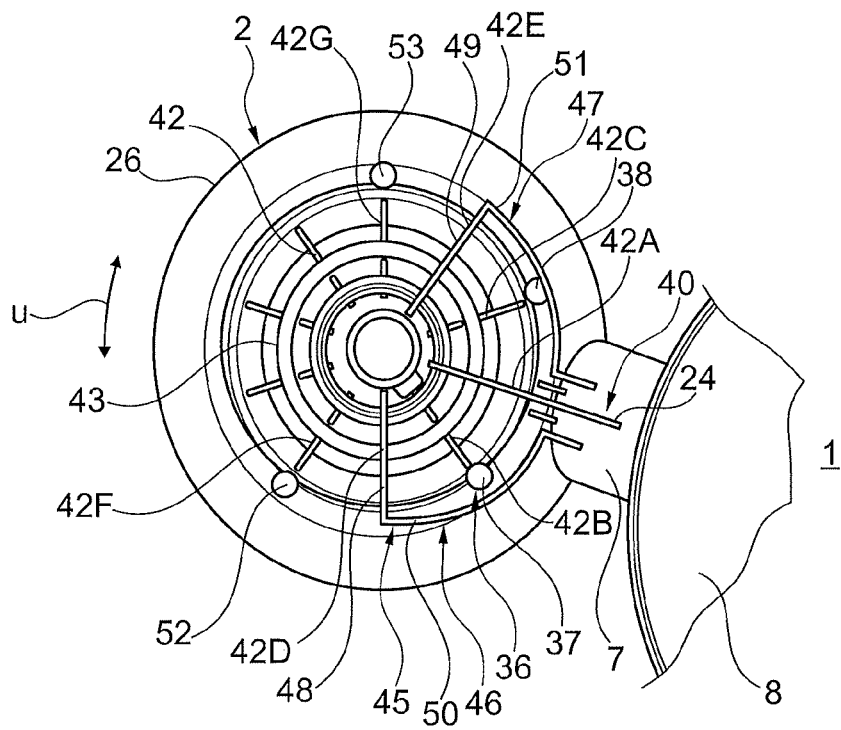
FIG. 5 shows a schematic front view of the jet engine according to FIG. 3 and FIG. 4 in a first mounting position installed on a first side of the aircraft.
Figure 6:
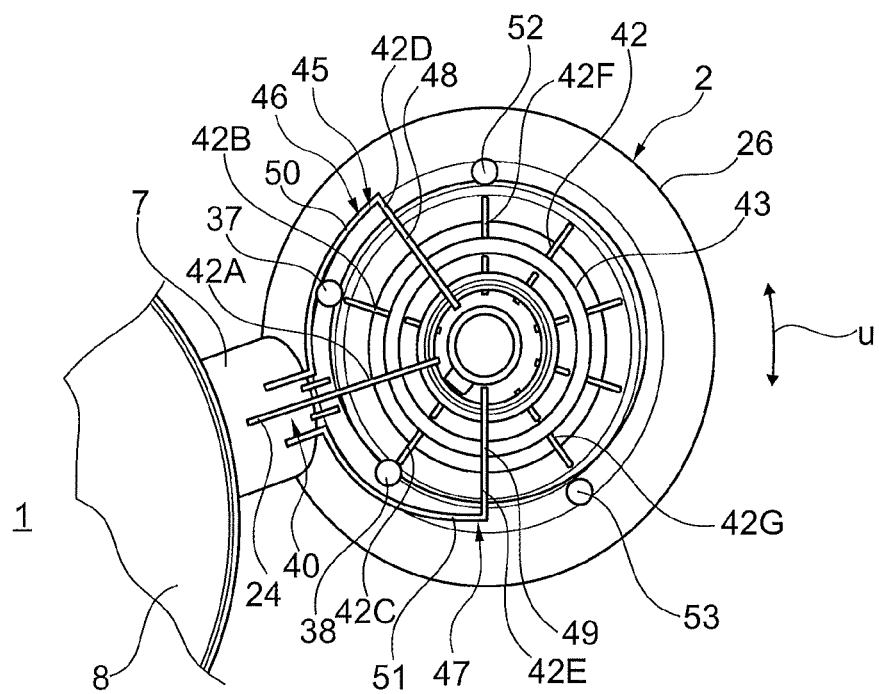
FIG. 6 shows a view of the jet engine according to FIG. 5 in a second mounting position installed on a second side of the aircraft.

Further, FIG. 4 to FIG. 6 show, in sections, an operating equipment appliance that is embodied as a hydraulic appliance 45, wherein the hydraulic appliance 45 has two fluid areas 46, 47. Here, each of the mirror-inverted manner fluid areas 46, 47 is designed in such a manner that it can optionally be used for venting (vent) as well as for oil draining and oil recirculation (drain/scavenge). The conduit areas 48, 49 of the fluid areas 46, 47 respectively extend through support struts 42D and 42E from the intermediate housing 43 in the direction of the fan housing 55, with a further conduit area 50, 51 respectively connecting thereto, extending in the circumferential direction U towards the interface device 40 in the nacelle installation space 26.

The support struts 42D and 42E that receive the conduit areas 48, 49 are in turn arranged to be symmetrical to the support strut 42A that is assigned to the interface device 40 and thus to the interface device 40, wherein in the present case an angle between the conduit areas 48, 49 is 144°, as viewed in the circumferential direction U.

Further, in the area of further support struts 42F and 42G, lifting points 52, 53 are arranged, which are formed with corresponding attachment means and at which the jet engine 2 can be supported for being mounted at the aircraft 1. Here, the support struts 42F and 42G again extend symmetrically to the interface device 40 and in a mirror-inverted manner to the support struts 42B, 42C of the engine attachment points 37, 38.

Of course, the distance between the support struts, in which the engine attachment points, the conduits of the fluid areas and lifting points are received, varies with the total number of support struts. Thus, in the embodiment according to FIG. 4, an angle between the lifting points 52, 53, as viewed in the circumferential direction U, is for example 72°, whereas the angle in the embodiment according to FIG. 5 and FIG. 6 is 144°.

FIG. 5 and FIG. 6 show the jet engine 2 in a first mounting position and in a differing second mounting position at the aircraft 1, wherein in FIG. 5 the jet engine 2 is shown in a mounting position on the right side of the aircraft, and in FIG. 6 is shown pivoted by 144° in a mounting position on the left side of the aircraft. The fluid area 46 that serves for venting when the jet engine 2 is mounted on the right side according to FIG. 5 becomes an oil return line in case of a mounting on the left side according to FIG. 6, while the fluid area 47 that serves for oil recirculation when mounted on the right side serves for venting when mounted on the left side.

As follows from a comparison of FIG. 4 and FIG. 5, the arrangement of the jet engine 2 on the right side of the aircraft is substantially mirror-inverted to the arrangement of the jet engine 2 on the left side of the aircraft with respect to an aircraft median longitudinal plane, wherein the lifting points 52, 53, the conduit areas 47, 48 and the engine attachment points 37, 38 respectively take a position that is switched with respect to one another, and the functionalities of the fluid areas 46, 47 are switched.

Thus, it is principally possible to use jet engines of identical design to link these at the aircraft 1 on different sides of the aircraft 1 with differing linking angles.

PARTS LIST

1 aircraft
2, 3, 4 jet engine
6 vertical stabilizer
7 engine pylon
8 aircraft fuselage
10 air inlet
12 bypass channel
13 inflow area
14 fan
15 engine core flow channel
16 compressor appliance
17 burner
18 turbine appliance
19, 20, 21 rotor device
22 central axis
23 auxiliary device gear appliance
24 drive shaft
25 bevel gear
26 nacelle installation space
27 auxiliary units
28 engine shaft, low-pressure shaft
29 conduits
30 frame appliance
31 linking elements
33 connection appliance
36 linking device
37, 38 engine attachment point
40 interface device
42, 42A to G support strut
43 intermediate housing
45 operating equipment appliance; hydraulic appliance
46, 47 fluid area
48, 49 conduit area
50, 51 further conduit area
52, 53 lifting point
54 engine shaft, high-pressure shaft
55 carrier structure, fan housing
R radial direction of the jet engine
U circumferential direction of the jet engine

The invention claimed is:

1. A jet engine comprising:
an attachment member for linking the jet engine at an element of an aircraft in a first mounting position and a second mounting position,
an operating equipment appliance which has a first fluid area and a second fluid area for connect to the aircraft,
wherein, in the first mounting position the first fluid area is assigned to a first functionality and the second fluid area is assigned to a second functionality,
wherein, in the second mounting position, the first fluid area is assigned to the second functionality and the second fluid area is assigned to the first functionality.

2. The jet engine according to claim 1, wherein the fluid areas are assigned to re-circulation and venting as functionalities.

3. The jet engine according to claim 1, wherein the fluid areas have conduit areas that are arranged at a distance to each other in a circumferential direction of the jet engine, wherein the conduit areas are arranged so as to be symmetrical to the attachment member in the circumferential direction of the jet engine.

4. The jet engine according to claim 1, wherein the attachment member includes two engine attachment points, wherein the attachment member is connected to a carrier structure of the jet engine in an area of the engine attachment points.

5. The jet engine according to claim 4, wherein the attachment member comprises an interface device to the aircraft positioned centrally to the two engine attachment points in the circumferential direction.

6. The jet engine according to claim 1, and further comprising two lifting points configured for mounting the jet engine distributed in a circumferential direction of the jet engine, wherein the lifting points are arranged to be symmetrical to the interface device in the circumferential direction.

7. The jet engine according to claim 1, and further comprising a support strut extending in a radial direction through a bypass channel of the jet engine, wherein the fluid areas extend inside the support strut.

8. The aircraft with a jet engine according to claim 1, and further comprising a radially outer engine cladding and an auxiliary device gear appliance that comprises multiple auxiliary devices and that is configured to be driven by an auxiliary shaft that is in operative connection with an engine shaft that rotates about a central axis, wherein the auxiliary device gear appliance is arranged in a radial direction of the jet engine substantially outside the outer engine cladding of the jet engine.

9. The aircraft according to claim 8, wherein the auxiliary device gear appliance is linked to a frame appliance that is directly connected to at least one chosen from an aircraft fuselage and an aircraft wing.

10. The aircraft according to claim 9, wherein the frame appliance is arranged at least partially inside an engine pylon that is assigned to the jet engine.

11. The aircraft according to claim 9, wherein the frame appliance has linking elements for at least one chosen from the auxiliary devices, a conduit, a tube and a wiring harness.

12. The aircraft according to claim 8, wherein the auxiliary device gear appliance is arranged at least partially inside at least one chosen from an aircraft fuselage, an engine pylon and an aircraft wing.

13. The aircraft according to claim 12, wherein the auxiliary shaft that drives the auxiliary device gear appliance extends through a support strut of the jet engine, with the jet engine being linked to the at least one chosen from the aircraft fuselage, the engine pylon, and the aircraft wing in an area of the support strut.

* * * * *